Nov. 29, 1927.  L. DE FLOREZ  1,650,887
METHOD AND APPARATUS FOR THE CONTROL OF TEMPERATURE
Filed Feb. 14, 1925  2 Sheets-Sheet 2
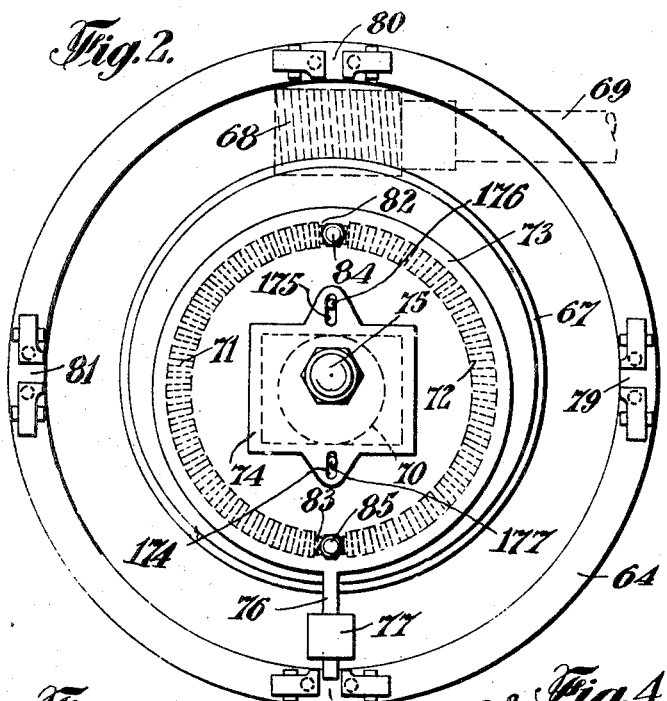
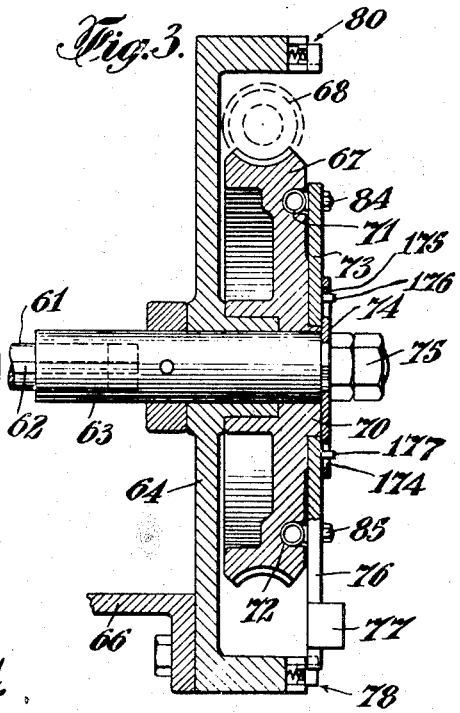
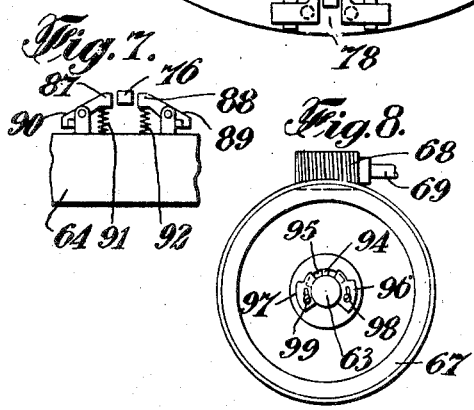
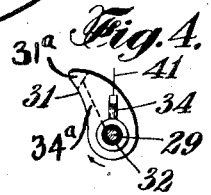
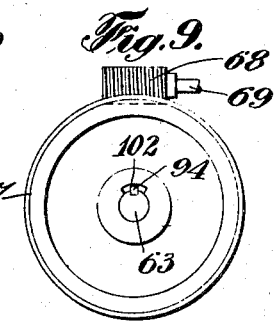
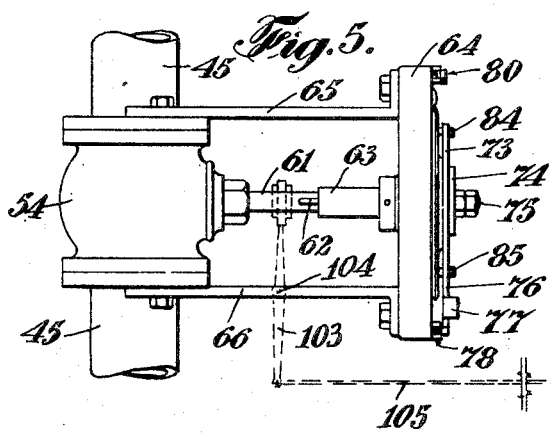
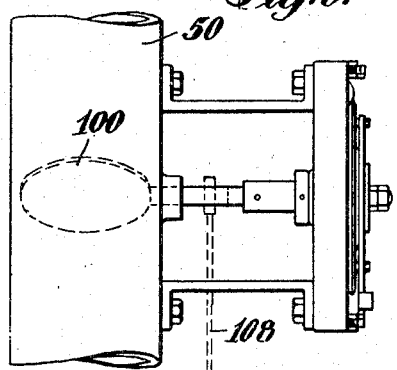
Inventor
Luis de Florez
By his Attorney
Ramsay Hoguet Patented Nov. 29, 1927.

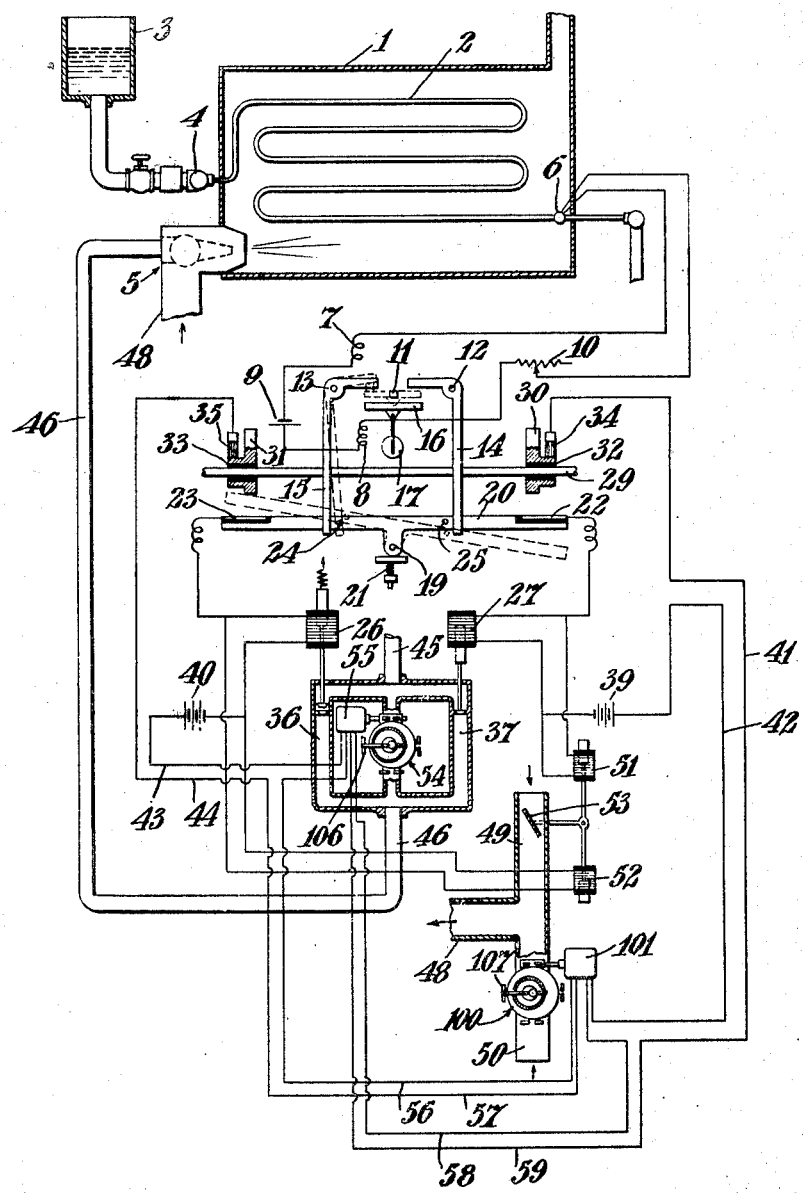

1,650,887

UNITED STATES PATENT OFFICE.

LUIS DE FLOREZ, OF POMFRET, CONNECTICUT, ASSIGNOR, BY MESNE ASSIGNMENTS, TO THE TEXAS COMPANY, OF NEW YORK, N. Y., A CORPORATION OF DELAWARE.

METHOD AND APPARATUS FOR THE CONTROL OF TEMPERATURE.

Application filed February 14, 1925. Serial No. 9,359.

My invention relates to controlling means applicable to a very wide variety of uses such as the control of temperature in response to temperature variations at a selected point, the control of fuel input to heat a device in response to temperature or pressure due to the heat generated thereby and to many other uses.

In carrying out my invention, I arrange the apparatus so that increments of control are integrated and such integration, when it reaches a predetermined sum, operates, controls or influences other controlling means. This principle may obviously be applied in a number of ways, depending upon the particular control problem attacked, among which I may cite; the control of the same medium by two controlling means, one operating by relatively large increments and another by relatively small increments of control; the integration of the increments of control of the second controlling means operating or influencing the operation of the first controlling means when those increments reach a predetermined sum; the control in response to the integration to a predetermined amount of the increments of control of a given medium; of a controller or controllers operating upon related mediums,—for instance, the control of air by a controller of fuel; or the control by the summation of increments of control of a means which indirectly affects the control of the same or a different medium,—for instance, the control of the speed of a blower by the summation of the increments of control of a valve controlling fuel or the like.

It will be seen from the foregoing that my invention has a very wide application and that it may be usefully applied to the solution of many controlling problems, such as the control of liquid or gaseous fuel by the opening and closing of valves or of solid fuel by the regulation of the speed of a stoker, or to the control of draft, temperature, speeds, refrigeration, pressure and in fact many problems which demand a control of flow, pressure, temperature, speed, volume, current, voltage, weight or similar quantities.

It will, therefore, be understood that I do not wish to confine myself to the particular method and devices illustrated and described in the following specification because I have chosen to illustrate my invention in a very simple form of the application of the principle to the control of furnace temperatures in response to variations in temperature of the medium heated thereby. In the illustration the control is a control of liquid fuel effected by a major and minor control of the fuel input of the furnace in response to changes in temperature of the medium heated by the furnace. This application also illustrates a control of the air input into the burner.

It will be understood that in changing the temperature or heat level of the furnace or any heated area the furnace or area will have what might be called a heat momentum in the direction of the change so that the fuel correction which is ordinarily supplied to bring the temperature back to its normal state is either so great in amount or length of time as to cause the temperature to go beyond the desired point in the opposite direction. This phenomena occurs in both directions of control and consequently results in a hunting of the fuel control apparatus. I have found that this tendency to hunt can be overcome and a correspondingly closer control secured by supplying the fuel and/or the air in quantities of over-sufficiency or under-sufficiency of predetermined magnitude which anticipate and provide for the momentum of temperature change; the time over which this correction is applied may be a function of the temperature change itself or at predetermined periods. For the specific form of my invention illustrated and which I shall hereinafter more fully describe, I provide for this regulation in two broad ways: one a major control to secure the approximate heat level and a supplementary or minor control to maintain that level or temperature. These may be either used in combination or separately but for the purposes of illustration I combine their operations. The control is intermittent at small intervals of time and which are of a duration of time determined by the extent of temperature change and at the time the minor or vernier control is applying small corrections of over-sufficiency or under-sufficiency, the major control is integrating those changes on whichever side of the desired temperature the regulating is being done. That is, the plus or minus corrections are being added and if their sum becomes sufficiently large—which would be the case when the temperature change went beyond the ability of the minor control to correct it—the major control will act to restore the approximate heat level again after which it is maintained as before by the minor control.

The apparatus and means for accomplishing this will be clearly set forth in the following description and drawings:

In the drawings I show:

In Fig. 1 a diagrammatic scheme of the apparatus;

In Fig. 2 a plan view of the control for the main valves;

Fig. 3 is a vertical section through Fig. 2;

Fig. 4 is a detail of the contacting cams and brushes;

Fig. 5 is a side view of the main valve and its regulating apparatus;

Fig. 6 is a view of the damper and its regulating apparatus;

Fig. 7 is an elevation of the latches on the worm wheel; and

Figs. 8 and 9 are variations in the method of attaching the worm wheel to the valve spindle.

The preferred form of this apparatus is shown in Fig. 1 where 1 is a combustion chamber in which may be mounted a pipe still or other means to be heated which is fed by oil from the reservoir 3 through a header 4. This chamber 1 is heated by a burner of any conventional type such as 5 and at 6 is a thermo-couple at which point in this course it is desired to maintain the temperature at a given point. The thermo-couple 6 has leads to a galvanometer which is indicated by the coils 7 and 8 supplied by battery 9; and by the variable resistance 10. This galvanometer, as shown, is of the Wheatstone bridge type where the E. M. F. of the thermo-couple works against the standard cell 9. It would be equally satisfactory to employ a type of galvanometer where the thermo-couple E. M. F. works against a spring. The setting of this galvanometer would then be made by adjusting the spring instead of the variable resistance 10 as in this case. The galvanometer needle is shown at 11, which as indicated by the dotted lines may swing to the right or to the left depending upon the temperature as indicated by the thermo-couple 6. Pivoted at 12 and 13 are the bell cranks 14 and 15 and these bell cranks are so located that the galvanometer needle 11 will fit in between them but that any variation of this galvanometer needle to one side or the other will bring it under either one or the other of the bell cranks. At 16 is a chopper which is constantly reciprocated by any well known means, such as the crank at 17. The bar 20 is pivoted at 19 so as to swing freely about this pivot under the control of a spring friction device such as 21, which merely keeps the bar 20 from swinging too freely. At 29 is a shaft which continually revolves at a given speed and on which are mounted cams 30 and 31 of the shape shown in Fig. 4. These cams are insulated from the shaft 29 by the insulation 32 and 33 and contacting the hubs of these cams are the brushes 34 and 35. The bar 20 has contact pieces 22 and 23 which are insulated from the main bar as shown and also on this bar are the studs 24 and 25, which are so arranged that any slight movement of the bell cranks 14 and 15 will bring those bell cranks against these studs to cant the bar 20 in a direction depending upon which of the studs 24 or 25 is contacted. At 26 and 27 are solenoid valves which control the flow of fluid through the auxiliary pipes 36 and 37 and these solenoid valves are in a series circuit as shown. That is, solenoid 27, cam 30, contact piece 22 and battery 39 are in the same series circuit, while the solenoid 26, cam 31, contact piece 23 are in another series circuit with battery 40 so that it is obvious that any contact between cam 31 and contact piece 23 will serve to close the circuit of battery 40 and energize the solenoid valve 26. In a similar manner any contact between the cam 30 and the contact piece 22 will close the circuit of battery 39 to energize the solenoid valve 27. As a result, the control of these solenoid valves 26 and 27 depends upon contacts made between the contact pieces 22 and 23 with their respective cams. The burner 5 is fed with fuel from the main pipe 46 and the necessary air for combustion is supplied by the pipe 48 and while this pipe 48 is shown broken in the upper part of the diagram, it is a continuation of the pipe 48 shown in the lower part of the diagram. The main fuel supply pipe is at 45, which as shown has a straight connection with the pipe 46 and also the two auxiliary pipes 36 and 37, so that the main supply of fuel is controlled by valve 54 and the pipes 36 and 37 act as supplementary or minor control of the fuel depending upon the action of the solenoid valves 36 and 37. The main valve 54 may be of any accepted form, such as the globe valve shown in Fig. 5 and this valve in turn is controlled by the motor 55 as will be explained hereafter.

The leads from the motor 55 are in series with the circuits of batteries 39 and 40 and as this is a reversible motor, its direction of rotation will depend upon whether the circuit of batteries 39 or 40 is closed, which in turn depends upon which of the cams 30 or 31 makes contact with the bar 20. The air pipe 48 has a main control consisting of a valve 100 which governs the main air supply and a damper 53 in pipe 49 which gives an auxiliary or minor control of the air. At 51 and 52 are two solenoids which are so connected with the damper 53 that any action of one or the other of the solenoids would change the damper 53 in a like amount and these solenoids 51 and 52 are also in series with the circuits of the batteries 39 and 40 and they act accordingly. The main air valve 100 is actuated in the same manner as the main fuel valve 54. That is, it responds to a motor 101 controlling a valve device and this motor 101 is also reversible having its leads 56 and 57 and 58 and 59 in series with the circuits of batteries 39 and 40. Therefore, as all these circuits are preferably in series, any contact between cam 30 and contact piece 22 of the bar 20 will close the circuit of battery 39 and everything in that circuit will be energized, which means the solenoid valve 27, motor 55, the solenoid 51 and the motor 101. Similarly, any contact between cam 31 and contact piece 23 will close the circuit of the battery 40 and energize the solenoid 26, the motor 55 in the opposite direction, the solenoid 52 and the motor 101 also in the opposite direction so that it is evident that the main control of the whole apparatus resides in the contacts between cams 30 and 31 and the bar 20 which in turn depends upon which of the bell cranks 14 or 15 are actuated by the galvanometer needle 11 swinging to one side or the other depending upon the temperature change as recorded by the thermo-couple 6. Of course, if the temperature remains exactly at the correct point as determined by the setting of the galvanometer needle, it will be in a central position as shown by the solid lines and as there will be no contacting with bar 20, there will be no change in the apparatus. The main fuel valve 54 and the main air valve 100 are controlled by the motors 55 and 101 respectively as shown. See Figs. 2, 3, 5 and 7. These mechanisms are alike and the description of one will apply to the other.

In Fig. 2 the shaft 69 is the motor shaft of either motor 55 or 101 and this shaft 69 has on it a worm 68 which in turn drives worm wheel 67. The valve spindle 61 is the valve spindle of either the valve 54 or 100 and on this spindle 61 is a hub or sleeve 63 which is a sliding fit upon spindle 61 with which it has key connection 62. The bearing for the sleeve 63 within the casing 64 is supported on the valve by braces 65 and 66 of Fig. 5. This casing 64 has a hub which forms a bearing for the worm wheel 67 as shown in Fig. 3, so that this worm wheel 67 may be rotated freely by the worm 68 without rotating the spindle 63. On the worm wheel 67 as indicated at 70 is cut a cam and concentric with this cam on the same worm wheel is cut a circular channel which has two reduced portions 82 and 83 in Fig. 2 and in this channel are two helical springs 71 and 72 having their ends abutting against the reduced portions 82 and 83 of the channel in the worm wheel 67. Over the cam 70 on the worm wheel 67 is fitted a plate 73 having a square opening so as to be acted upon by the cam 70 after the manner of a Scotch yoke and at the same time is large enough to cover the springs 71 and 72. This plate 73 has an extension 76 of sufficient length to extend partially over the edge of the casing 64 and on this extension 76 is a weight 77, the function of which is solely to give momentum when the plate 73 is rotated. Radially with this extension 76 and on the extension is a stud 85 and diametrically opposite is another stud 84. These two studs extend downwardly to act against the springs 71 and 72 so that when the worm wheel 67 is moved the springs will be carried by it, but if the plate 73 is held fast these springs will compress against the studs 84 and 85 to store up the energy of compression of the springs. The holding of this plate 73 is accomplished by the extension 76 being held in any of the latches 78, 79, 80 or 81 and in this instance I show it held in latch 78. It will be understood that the position and number of these latches is not limited but that they may be placed in any part or in any number upon the periphery of the casing 64 in accordance with the desired movement of the valve 54 as predetermined by the conditions to be met in any particular installation. The details of these latches are shown in Fig. 7, where the extension 76 is shown held between two parts 87 and 88 which are pivotally mounted upon the casing 64 and which are held in an upward position by the compression springs 91 and 92 so that in approaching this latch the extension 76 will contact the inclined surfaces 89 and 90 of the parts 87 and 88 to force either of them down until extension 76 enters between them whereupon the depressed part rises and holds extension 76. It will be noted that there is sufficient clearance between the extension 76 and the parts 87 and 88 so that when the extension 76 enters the latch with any degree of speed either of the parts 87 or 88 which have been depressed will rise before the extension 76 could rebound and miss being held in the latch.

I have shown that the sleeve 63 is slidably keyed to the spindle 61 of the valve and this has been done because, when the valve is either opened or closed the spindle will move in and out accordingly and as the casing 64 is fixed this movement of the valve spindle is taken care of within the sleeve 63. On the outer extremity of this sleeve 63 are the holding nuts 75 which are set with a plate 74 which serves to act as a retaining plate for the worm wheel 67 and the plate 73. This plate 74 is keyed to the sleeve 63 and has two slots 174 and 175 in which are pins 176 and 177 which are fixed to the plate 73. Consequently any rotary movement of plate 73 will turn the sleeve 63 through the retaining plate 74. The slots 174 and 175 permit sufficient movement of the pins 176 and 177 to take care of the eccentricity of movement between the plates 73 and 74. So it will be seen that the worm wheel 67 is governed in its rotation by the shaft 69 of either of the motors 55 or 101 and that the rotation of either valve 54 or 100 is governed by the movement of the plate 73 which in turn is actuated by the combination of the cam 70 and the springs 71 and 72 and that this plate 73 is held fast by the extension 76 in any of the latches such as 78 until the part 76 is withdrawn, as will appear later.

In the foregoing description the cams 30 and 31 of Fig. 1 are shown in Fig. 4 as having a contour which causes them to give a variable time of contact with the bar 20 dependent upon the extent of temperature change. To meet conditions that may arise to warrant it, I may equally well have a constant time of contact with the bar 20 by making the cams non-conducting and placing a contact piece on their tips. This is shown in Fig. 4 where the cam 31 would be of insulating material and have a contact piece 31ª at the tip and a connection 34ª to the conducting hub and thus to the brush 34. This is but an illustration and obviously I can secure the same result of intermittent but constant time of contact in a variety of ways.

Having described the apparatus embodying one form of my invention, I will now describe its operation. Assuming that the furnace 1 is cold and that it is desired to bring it to a desired heat level, the galvanometer is set to the desired point by the resistance 10 after which the switches controlling the two circuits are closed. In this condition the galvanometer needle will naturally be far to one side and in this case it would be far to the right under the bell crank 14. The shaft 29 being at its rate speed and the chopper 16 in operation, the swing of the galvanometer needle 11 to the right would cause the bell crank 14 to pivot about and abut the stud 25 on the bar 20 and to cant the bar in the opposite direction to that shown in the dotted line. Consequently, the cam 30 will contact the piece 22 throughout the full contact of the cam and the circuit of battery 29 will be closed. This will open the solenoid valve 27 and the solenoid valve 26 being in its natural open position both auxiliary pipes 36 and 37 will take their full flow of fuel. The circuit of battery 39 being closed the motors 55 and 101 will start up and the solenoid 51 will open the auxiliary damper 53 to its full extent so that the first effect of the closing of this circuit is to open the auxiliary controls to their full extent and motors 55 and 101 being started up the valves 54 and 100 will open as follows: The worm wheel 67 will be turned by the worm 68 and as this worm wheel rotates two things occur,—one of which is that the springs 71 and 72 will be carried around with the worm wheel to compress against the studs 82 and 83. That is, in a counter-clockwise direction of rotation of the worm wheel 67, spring 71 will be carried around by the reduced portion 82 and abut against the stud 85 while the spring 72 will be carried around by the reduced portion 83 to abut against the stud 84. Consequently, the plate 73 has a compression and both of these springs act upon it. The second thing is that as the worm wheel 67 rotates the cam 70 acts upon it to gradually throw the plate diametrically away from the latch which holds it, so that the extension 76 is gradually withdrawn from its holding latch, in this case 78. As the worm wheel 67 continues to rotate the extension 76 will be finally entirely withdrawn from the latch and as this occurs the already explained compression of the springs 71 and 72 will cause the plate 73 to swing rapidly about the cam 70 and as it does this, the extension 76 is thrust forward so that as it approaches the next latch, such as 79, it enters this latch by depressing part 87 in Fig. 7 and is stopped by part 88 in the same figure. This partial rotation of the plate 73 carries plate 74 with it and opens the valve to some extent and fuel will begin to flow in pipe 46 from both the auxiliary pipes 36 and 37 and the main pipe 45 and also air will begin to flow through pipe 50 and join that air coming through pipe 49 to supply the main pipe 48 of the burner 5. The continued rotation of the worm wheel 67 continues the action of the plate 73 as just explained and the valve continues to open intermittently in consequence so that more fuel is fed to the furnace and more air to balance the increased fuel and as this occurs the temperature of the furnace will naturally rise.

This temperature rise will continue until the approximate heat level in the furnace 1 is reached. This will naturally occur while the extension 76 of the plate 73 is in one of the latches because as this level is reached the galvanometer needle 11 will seek its mid point and the bar 20 will no longer contact the cam 30 so that the circuit of battery 39 will remain open. This will occur as aforesaid while the extension 76 is in one of the latches and while there may be some movement of the worm wheel 67 it will not be sufficient to draw the extension 76 from its latch before the circuit remains open as just said. This is the point of major temperature control which is the function of the valves 54 and 100 and we have the condition that the minor control alone of both the fuel and the air will begin to take place, which occurs as follows: As long as the galvanometer needle 11 is at the middle point because of the correct temperature in the furnace 1 nothing occurs and all settings remain the same. That is, solenoid valve 26 is normally open and solenoid valve 27 is normally closed and fuel is flowing through valve 54 and auxiliary pipe 40 to the main supply pipe 46 and the air is entering the pipe 48 through the valve 100 and the damper 53. Now if the temperature should vary slightly in the furnace 1 the needle will swing under either bell crank 14 or 15 and move the bar 20 accordingly so that contact between this bar and either of the cams 30 or 31 will be made, depending upon which way the bar 20 is canted. If the temperature change is only slight the galvanometer needle, it is evident, will remain under either one or the other of the bell cranks for a very short time and if the temperature is too high, the needle 11 will swing to the left causing the chopper 16 to move the bell crank 15 and cant the bar 20 in the direction shown. Contact will then be made between this bar and cam 31 to close the circuit of the battery 40 which in turn closes the solenoid valve 26 and less fuel will flow, also solenoid 52 will act to slightly close the damper 53 and proportion the air of the reduced fuel supply. Motors 55 and 101 will receive current and will start up but, unless the temperature change is great, needle 11 will only deviate momentarily so that the cam contact is only for a part of its contour and battery 40 is only closed for a slight period and rotation of motors 55 and 101 is insufficient in extent to rotate the worm wheel 67 enough to withdraw extension 76 from its latch and the main valves 54 and 100 will not change position. Conversely, when the circuit of battery 39 is momentarily closed by the galvanometer needle swinging to the right because of a lower temperature, the solenoid valve 26 will remain open, the solenoid valve 27 will open and solenoid 51 will further open the damper 53 and both motors 55 and 101 will turn in the reverse direction and have the same effect, upon the worm wheel 67 without moving the plate 73. Therefore, it will be seen that the slight change in temperature in the furnace 1, the solenoid valves 26 and 27, control the temperature change and that the solenoids 51 and 52 proportion the air accordingly and that the only effect of this closing of either or both circuits is to cause the two motors 55 and 101 to intermittently reverse their direction but not sufficiently to move the plate 76. That is, the worm wheel 67 will tend to hunt backwards and forwards without effecting the setting of valves 54 or 100. In other words, the main valves 54 and 100 are constantly integrating the increments of control from the minor solenoid valve control and unless this integration reaches the predetermined sum, the valves will not move. However, if this integration exceeds the predetermined sum, then wheel 67 has rotated enough to cause extension 76 to be withdrawn and the settings of valves 54 or 100 or both to be changed. This works for either an increase or decrease of temperature and as soon as the approximate heat level is restored by the main valves, the solenoid valves act as before to maintain that level. It should be noted that the flow of fuel controlled by the solenoid valves 26 and 27 is entirely a function of the time for which these valves are open and not of the extent of opening because that extent is always full travel, so that the feeding of fuel controlled by these valves takes place in puffs or gusts of variable durations of time and these puffs or gusts are most accentuated at the valves but may be gradually smoothed out in passage through the pipe 46 if so desired, to provide a substantially smooth and constant flow of fuel to the burner 5. The flow of air through the damper 53 is a function of the opening of that damper in the form shown but it might equally well be made a function of time through having an opening of constant area as in the case of the solenoid valves 26 and 27.

In Fig. 8 I show a variation in a method of attaching the worm wheel 67 to the sleeve 63 which comprises an enlarged key way 95 and two adjustable stops 96 and 97. These stops may be adjusted by the set screws 98 and 99 to give a degree of rotation to the worm wheel 67 before the key 94 abuts either of the stops 96 or 97. This variation allows the worm wheel 67 to hunt as hereinbefore described without affecting the sleeve 63. In Fig. 9 is another variation where the key 94 rests in an enlarged slot 102 and the function of this is exactly the same as the function described in Fig. 8, except that the extent of this wide key way 102 is not adjustable as in the case of Fig. 8, but the worm wheel is allowed to hunt backwards and forwards within the limits of this key way 102 without affecting the sleeve 63. In Fig. 6 I show another variation whereby I eliminate the mechanism of valve 100 and connect that valve to respond to the motor valve 54 and this is accomplished by having a forked arm 103 connected to spindle 61 and pivoted at 104. This forked arm 103 is connected by a suitable rod or link to another rod or arm 108 on the valve 100 so that any motion produced in spindle 61 will be duplicated and proportioned to affect the valve 100 in a corresponding degree so that while I eliminate one valve operating mechanism, I proportion the air together with the fuel in the same manner as though the valve operating mechanism had been used. Also I can provide for manual operation of both of the valves 54 and 100 by suitable handles 106 and 107 and these handles may be adjusted to open or close the valve independently of the valve operating mechanism.

It is to be understood that I have described and explained my invention in a preferred form but that it is more widely applicable than the apparatus that I have shown, and inasmuch as my apparatus is adapted to all forms of fuels, including oils, gases, powdered fuels, etc., it will not be possible to describe the variations necessary for each, but I desire such variations to be included within the scope of my claims.

I claim as my invention:

1. In an apparatus of the character described, means to determine temperature changes, means for minor regulation, means to translate the temperature changes into proportional periods of time over which said means for minor regulation is effective and a major regulating means adapted to integrate the corrections of the minor regulating means and apply its correction when said integration reaches a predetermined sum.

2. In an apparatus of the character described, means to determine temperature changes, a minor regulating means and a major regulating means, means to translate the temperature changes into proportional periods of time over which the minor regulation applies corrections, said corrections being integrated by said major control to effect its correction when said corrections reach a predetermined sum in one direction.

3. In an apparatus of the character described, means to determine changes in temperature, an intermittently contacting device adapted to affect a minor regulating device in response to the temperature changes, a normally inoperative major regulating device adapted to integrate the corrections applied by the minor regulating device and effect a major correction when said integration reaches a predetermined sum.

4. In an apparatus of the character described, means to determine temperature changes, a temperature regulating device, means to translate the temperature changes into periods over which said regulating device is effective, another regulating device in operative relation with the first regulating device to effect additional regulation when the sum of the periods of regulation of the first regulating device reach a predetermined sum in one direction.

5. The method of temperature control which comprises predetermining a heat level, translating variations from that level into proportional periods of time to effect the operations of a regulating device, integrating those periods upon a second regulating device and operating the latter device when the integration reaches a predetermined sum.

6. The method of temperature control which comprises predetermining a heat level, maintaining that heat level by increments of regulation proportional to the deviation of temperature from the predetermined level, adding those increments in the direction of the variation and effecting another regulation when the sum of the increments in one direction reach a given amount.

7. The method of temperature control which comprises establishing a predetermined temperature level, intermittently actuating a regulating device in periods of time proportional to the variations from the established temperature level, adding the variations on another control and effecting the operation of that control when unidirectional variations reach a given sum.

8. The method of temperature control by two temperature modifying mediums which comprises translating variations from a given temperature into periods of time to effect the operation of a regulating device for one medium, causing a second regulating device for the same medium to act when the unidirectional variations reach a given sum, and controlling the second medium in the same manner to the same temperature variations as translated by the common means.

9. The method of temperature control which comprises effecting the operation of a regulating device to establish a heat level, effecting the operation of a second regulating device to maintain that heat level, intermittently actuating the latter device in response to variations from the established heat level, and effecting the operation of the first device to establish a different heat level when the sum of the regulatory periods of the second device reaches a given amount.

10. The method of temperature control, which comprises applying a correction of a fuel in units of quantities of an amount dependent upon the extent of temperature variation from a predetermined level and applying another correction of a continuous amount when the sum of the first correction in a given direction of temperature change reaches a given sum.

In testimony whereof, I have signed my name to this specification this 4th day of February, 1925.

LUIS DE FLOREZ.